(12) United States Patent
Tan et al.

(10) Patent No.: US 12,354,772 B2
(45) Date of Patent: Jul. 8, 2025

(54) CIRCUIT BREAKER FOR MONITORING POWER LINE

(71) Applicant: FOSHAN LONGWAY ELECTRON CO., LTD., Foshan (CN)

(72) Inventors: Wenxing Tan, Foshan (CN); Gordon Liu, Foshan (CN)

(73) Assignee: FOSHAN LONGWAY ELECTRON CO., LTD., Foshan (CN)

( * ) Notice: Subject to any disclaimer, the term of this patent is extended or adjusted under 35 U.S.C. 154(b) by 39 days.

(21) Appl. No.: 18/352,416

(22) Filed: Jul. 14, 2023

(65) Prior Publication Data

US 2024/0029920 A1   Jan. 25, 2024

Related U.S. Application Data

(63) Continuation of application No. PCT/CN2022/114118, filed on Aug. 23, 2022.

(30) Foreign Application Priority Data

Jul. 21, 2022   (CN) ......................... 202210858830.2

(51) Int. Cl.
*H01B 9/02* (2006.01)
*H01B 9/00* (2006.01)
(Continued)

(52) U.S. Cl.
CPC .............. *H01B 9/02* (2013.01); *H01B 9/006* (2013.01); *H01H 71/04* (2013.01); *H01R 24/28* (2013.01); *H01H 2071/044* (2013.01)

(58) Field of Classification Search
CPC .......... H02H 3/32; H02H 5/105; H02H 7/228; H01B 9/006; H01B 9/02; H01R 24/28; H01R 71/04; H01R 2071/044
(Continued)

(56) References Cited

U.S. PATENT DOCUMENTS

| 2007/0159740 A1* | 7/2007 | Williams | ................. H02H 3/33 361/42 |
| 2010/0046128 A1 | 2/2010 | Wang et al. | |

(Continued)

FOREIGN PATENT DOCUMENTS

| CN | 1885473 A | 12/2006 |
| CN | 201160178 Y | 12/2008 |

(Continued)

OTHER PUBLICATIONS

International Search Report and Written Opinion issued in corresponding PCT Application No. PCT/CN2022/114118, dated Dec. 22, 2022.

*Primary Examiner* — Kevin J Comber
(74) *Attorney, Agent, or Firm* — Westbridge IP LLC

(57) ABSTRACT

Disclosed is a circuit breaker monitoring a power line. The circuit breaker is provided with a power line monitoring circuit including a leakage current detecting circuit and a state judging circuit to monitor the on-off state of the shielding wire of the power line. When there is a leakage current between the phase and neutral wire of the power line and the shielding network wire is disconnected, the circuit breaker can automatically cut off the connection between the electrical appliance and the power supply to avoid the electric shock and fire accidents.

8 Claims, 7 Drawing Sheets

(51) Int. Cl.
*H01H 71/04* (2006.01)
*H01R 24/28* (2011.01)

(58) Field of Classification Search
USPC .......................................................... 361/42
See application file for complete search history.

(56) References Cited

U.S. PATENT DOCUMENTS

| | | |
|---|---|---|
| 2012/0075756 A1* | 3/2012 | Yu ............................ H02H 3/32 |
| | | 361/42 |
| 2016/0111869 A1 | 4/2016 | Li et al. |
| 2021/0125753 A1* | 4/2021 | Aromin .................. H01B 13/22 |
| 2024/0044998 A1* | 2/2024 | Li ............................ H02H 3/16 |

FOREIGN PATENT DOCUMENTS

| CN | 204928073 U | 12/2015 |
|---|---|---|
| CN | 114566942 A | 5/2022 |

* cited by examiner

CIRCUIT BREAKER FOR MONITORING POWER LINE

CROSS-REFERENCE TO RELATED APPLICATIONS

This application is a continuation application of International Application No. PCT/CN2022/114118, filed on Aug. 23, 2022, which claims priority to Chinese Patent Application No. 202210858830.2, filed on Jul. 21, 2022. The disclosures of the above-mentioned applications are incorporated herein by reference in their entireties.

TECHNICAL FIELD

The present application relates to the technical field of electricity safety protection, and in particular to a circuit breaker for monitoring a power line.

BACKGROUND

In daily use of electricity, some incidents of arc fault fires caused by damage, aging, poor insulating, overload heating and carbonization of the power line occur from time to time.

CN204928073U provides a circuit breaker protection device that is used to detect the leakage current between the phase wire and the neutral wire of the power line, which prevents the leakage current between the phase wire and the neutral wire due to aging and poor insulating. However, usually the leakage current is low, which is not enough to activate the overload protector and the short circuit protector. Therefore, it is necessary to use this device to detect the protection against electrical fire incidents. The device is mainly a circuit breaker with a plug power line, which is used to detect whether there is a leakage current between the phase wire, the neutral wire and the shielding wire of the power line between the power plug and the electrical appliance. When the signal is activated, the circuit breaker will trip and cut off the power to prevent fire incidents. However, this device has the following disadvantages: the shielding wire used for detecting is not monitored. If the shielding wire is partially disconnected, the device ca still supply power normally, but it cannot provide detecting for the part of the power line that has been disconnected. If there is an arc fault in this part of the power line, it may still cause an electrical fire accident.

SUMMARY

The main objective of the present application is to provide a circuit breaker for monitoring the power line. Not only can the circuit breaker detect the leakage current between the phase wire and the neutral wire of the power line, it can also monitor the on and off status of the shielding wire of the power line.

The present application provides a circuit breaker, including a housing, a plug pin, a power line, a rectifier circuit, an electromagnetic tripping and locking device.

The electromagnetic tripping and locking device includes an electromagnetic coil, a switch contact, a test circuit, and a first trigger driving circuit. The power line includes a phase wire and an insulating protective layer of the phase wire, a neutral wire and an insulating protective layer of the neutral wire, and a braided shielding wire. The first trigger driving circuit includes a first silicon controlled rectifier, a first resistance, and a second resistance;

a power line monitoring circuit is provided, and the power line monitoring circuit includes a third resistance, a fourth resistance, a leakage current detecting circuit and a state judging circuit;

the state judging circuit is provided with a first foot end, a second foot end, and a third foot end;

one end of the third resistance, a power supply end of the rectifier circuit, the first foot end of the state judging circuit and a positive end of the first silicon controlled rectifier are connected in parallel, and the other end of the third resistance, one end of the fourth resistance, the second foot end of the state judging circuit, and one end of the leakage current detecting circuit are connected in parallel to form a first node;

the other end of the fourth resistance, one end of the first resistance, the third foot end of the state judging circuit and the other end of the leakage current detecting circuit are connected in parallel to form a second node;

the other end of the first resistance, a control end of the first silicon controlled rectifier, and one end of the second resistance are connected in parallel; and a negative end of the first silicon controlled rectifier, the other end of the second resistance, and a common end of the rectifier circuit are connected in parallel.

In an embodiment, the state judging circuit includes a second silicon controlled rectifier;

the first foot end of the state judging circuit is a positive end of the second silicon controlled rectifier; the second foot end of the state judging circuit is a control end of the second silicon controlled rectifier; and the third foot end of the state judging circuit is a negative end of the second silicon controlled rectifier.

In an embodiment, the state judging circuit includes a triode.

In an embodiment, the triode is a negative-positive-negative (NPN) triode, the first foot end of the state judging circuit is a collector end of the NPN triode, the second foot end is a base end of the NPN transistor, and the third foot end is an emitter end of the NPN transistor.

In an embodiment, the power line is provided with the braided shielding wire, and the shielding wire includes a phase wire shielding wire wrapping an outer surface of the insulating protective layer of the phase wire and a neutral wire shielding wire wrapping an outer surface of the insulating protective layer of the neutral wire.

In an embodiment, at least one of the outer surface of the phase wire shielding wire and the outer surface of the neutral wire shielding wire is provided with an insulating protective layer; and the leakage current detecting circuit includes the neutral wire shielding wire and the phase wire shielding wire connected in series; one end of the leakage current detecting circuit is one end of the neutral wire shielding wire, and the other end of the neutral wire shielding wire is connected in series with the other end of the phase wire shielding wire; one end of the phase wire shielding wire is the other end of the leakage current detecting circuit.

In an embodiment, a signal wire with an insulating protective layer is also provided in the power line;

the neutral wire shielding wire is connected in parallel with the phase wire shielding wire and is connected in series with the signal wire to form the leakage current detecting circuit; and one end of the neutral wire shielding wire and one end of the phase wire shielding wire are connected in parallel to be one end of the leakage current detecting circuit, the other end of the neutral wire shielding wire, the other end of the phase wire shielding wire and the other end of the signal wire are connected in parallel, and one end of the signal wire is the other end of the leakage current detecting circuit.

In an embodiment, the power line is provided with the braided shielding wire, and the braided shielding wire includes a common shielding wire wrapping the outer surface of the insulating protective layer of the phase wire and the outer surface of the insulating protective layer of the neutral wire;

the signal wire with the insulating protective layer is also provided in the power line;

one end of the common shielding wire is one end of the shielding wire in the power line, the other end of the common shielding wire is the other end of the shielding wire in the power line; and one end of the braided shielding wire in the power line is one end of the leakage current detecting circuit, the other end of the braided shielding wire in the power line is connected in series with the other end of the signal wire, and one end of the signal wire is the other end of the leakage current detecting circuit. Not only can the circuit breaker detect the arc fault of abnormal leakage current between the phase wire and the neutral wire of the power line and automatically trip and cut off the power, this circuit breaker can also detect and monitor the on and off status of the shielding wire of the power line. Once the leakage current detecting circuit is disconnected, it will automatically trip and power-off. At the same time, through the setting of the leakage current detecting circuit, the third resistance, the fourth resistance, and the status judging circuit, the cost is relatively low while simplifying the production process and improving the reliability of the product. The circuit breaker can decrease the risk of electrical fire accidents to the greatest extent.

The circuit breaker is mainly the plug power line with the circuit breaker function, and is cooperatingly applied on household appliances as the power supply line of electric appliances.

The present application is further described in detail by the following embodiments.

DETAILED DESCRIPTION OF THE EMBODIMENTS

First Embodiment

Figure 1:
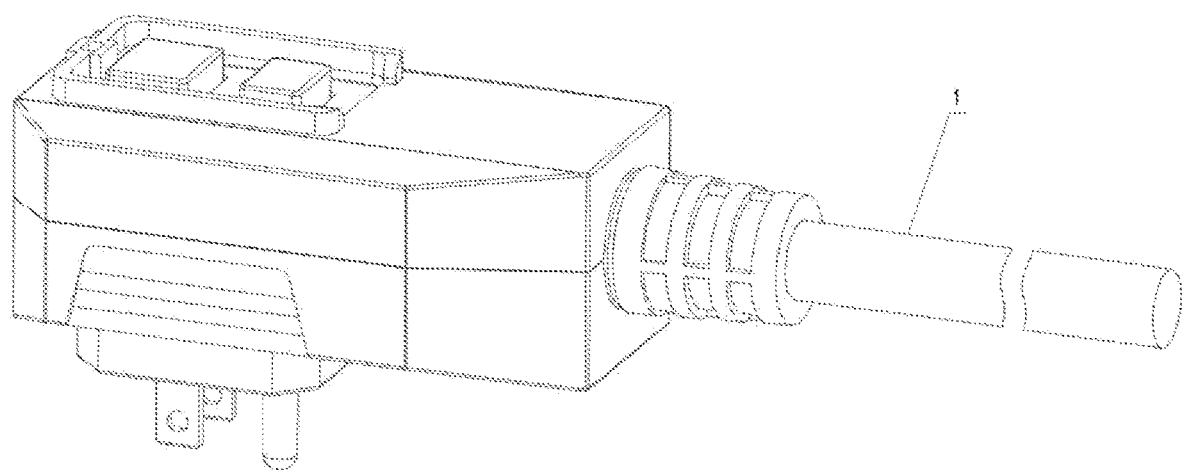
FIG. 1 is a schematic view of an appearance of a circuit breaker for monitoring a power line according to the present application.
Figure 2:
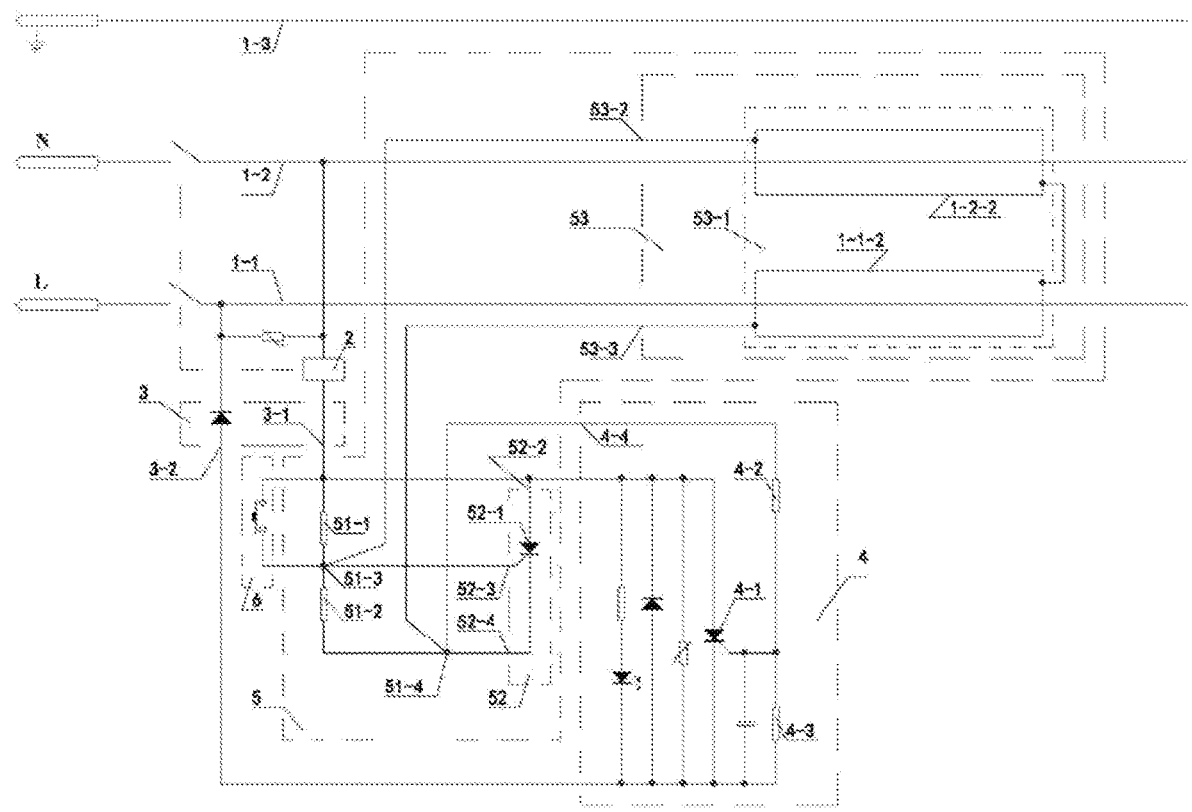
FIG. 2 is a schematic view of a circuit principle of the circuit breaker for monitoring the power line according to a first embodiment of the present application.
Figure 3:
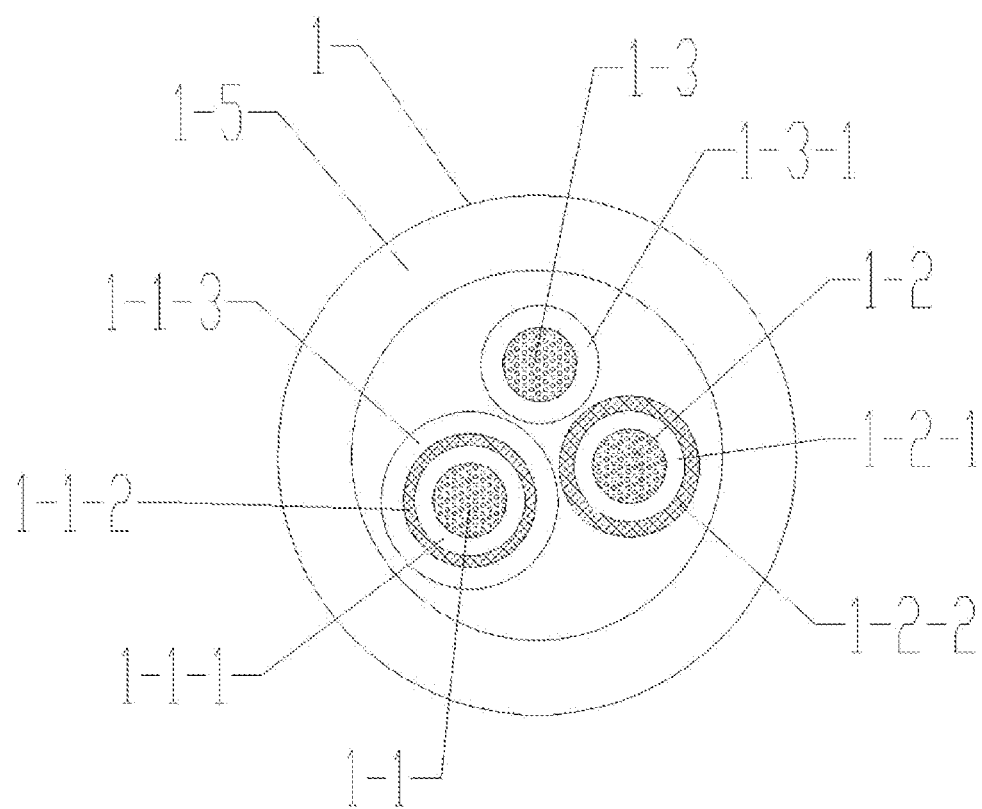
FIG. 3 is a schematic cross-sectional view of the power line in FIG. 2.

Referring to FIG. 1, FIG. 2, and FIG. 3, the present application provides a circuit breaker, including a housing, a plug pin, a power line 1, a rectifier circuit 3, and an electromagnetic tripping and locking device.

The electromagnetic tripping and locking device includes an electromagnetic coil, a switch contact, a test circuit 6, and a first trigger driving circuit 4.

The power line 1 includes a phase wire 1-1 and an insulating protective layer of the phase wire 1-1-1, a neutral wire 1-2 and an insulating protective layer of the neutral wire 1-2-1, and a braided shielding wire 53-1. The first trigger driving circuit 4 includes a first silicon controlled rectifier 4-1, a first resistance 4-2, a second resistance 4-3, and a power line monitoring circuit 5. The power line monitoring circuit 5 includes a third resistance 51-1, a fourth resistance 51-2, a leakage current detecting circuit 53 and a state judging circuit 52. The state judging circuit 52 is provided with a first foot end 52-2, a second foot end 52-3, and a third foot end 52-4. One end of the third resistance 51-1, a power supply end 3-1 of the rectifier circuit 3, the first foot end 52-2 of the state judging circuit 52, and a positive end of the first silicon controlled rectifier 4-1 are connected in parallel. The other end of the third resistance 51-1, one end of the fourth resistance 51-2, a second foot end 52-3 of the state judging circuit 52 and one end 53-2 of the leakage current detecting circuit 53 are connected in parallel to form a first node 51-3. The other end of the fourth resistance 51-2, one end 4-4 of the first resistance 4-2, a third foot end 52-4 of the state judging circuit 52 and the other end 53-3 of the leakage current detecting circuit 53 are connected in parallel to form a second node 51-4. The other end of the first resistance 4-2, a control end of the first silicon controlled rectifier 4-1, and one end of the second resistance 4-3 are connected in parallel. A negative end of the first silicon controlled rectifier 4-1, the other end of the second resistance 4-3, and a common end 3-2 of the rectifier circuit 3 are connected in parallel.

In this embodiment, the state judging circuit 52 includes a second silicon controlled rectifier 52-1, the first foot end 52-2 of the state judging circuit 52 is the positive end of the second silicon controlled rectifier 52-1, the second foot end 52-3 is a control end of the second silicon controlled rectifier 52-1, and the third foot end 52-4 is the negative end of the second silicon controlled rectifier 52-1.

Figure 4:
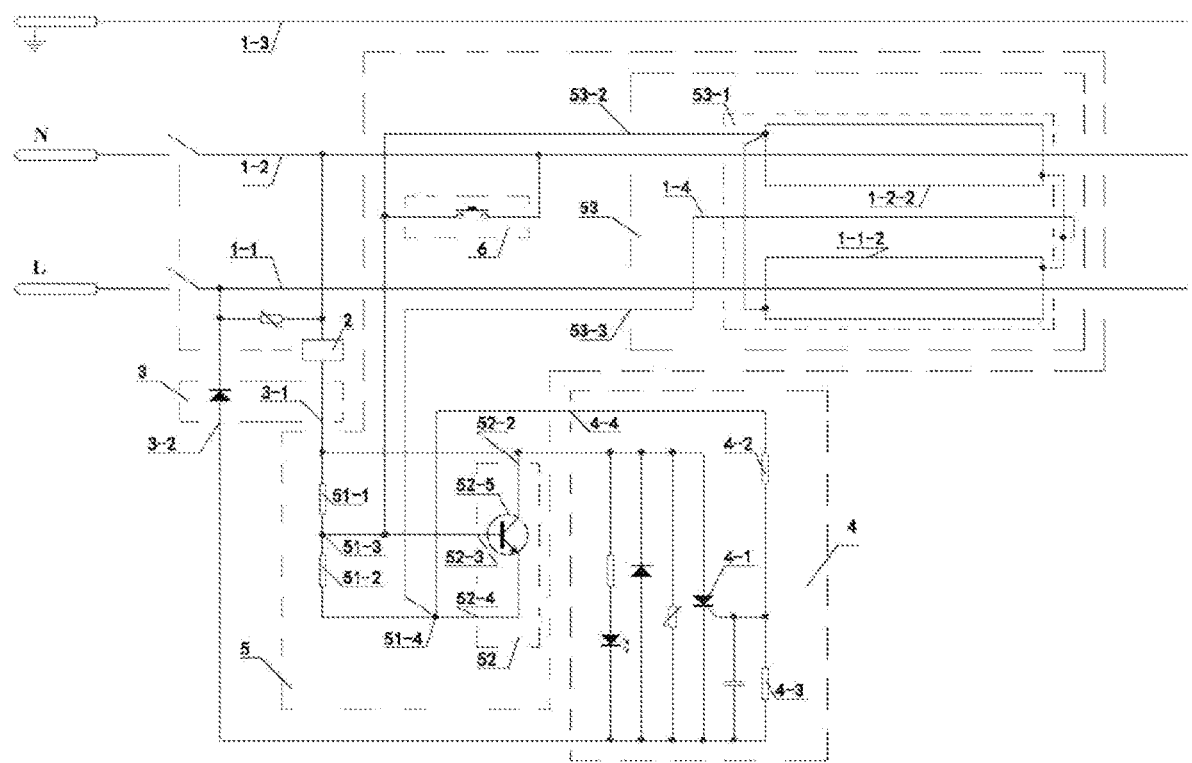
FIG. 4 is a schematic view of a circuit principle of the circuit breaker for monitoring the power line according to a second embodiment of the present application.
Figure 6:
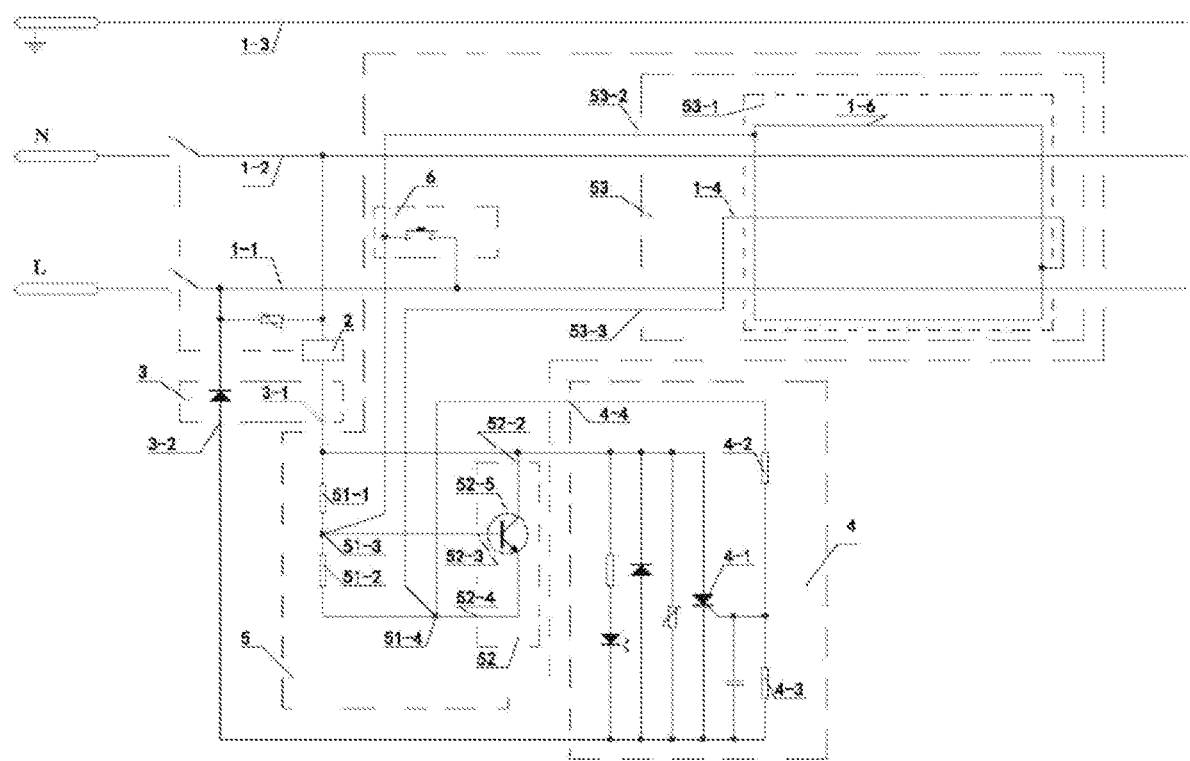
FIG. 6 is a schematic view of a circuit principle of the circuit breaker for monitoring the power line according to a third embodiment of the present application.

In an embodiment, the state judging circuit 52 can also be a triode, referring to FIG. 4 or FIG. 6, the triode is a negative-positive-negative (NPN) triode 52-5. The first foot end 52-2 of the state judging circuit 52 is a collector end of the NPN transistor 52-5, a second foot end 52-3 is a base end of the NPN transistor 52-5, and a third foot end 52-4 is an emitter end of the NPN transistor 52-5.

In this embodiment, the test circuit 6 is a test button. One end of the test circuit 6 is connected in parallel with one end of the third resistance 51-1, and the other end of the test circuit 6 is connected in parallel with the other end of the third resistance 51-1.

In an embodiment, one end of the test circuit 6 is connected in parallel with the neutral wire 1-2, and the other end of the test circuit 6 is connected in parallel with the other end of the third resistance 51-1, referring to FIG. 4.

In an embodiment, one end of the test circuit 6 is connected in parallel with the phase wire 1-1, and the other end of the test circuit 6 is connected in parallel with the third resistance 51-1, referring to FIG. 6. In this embodiment, the power line 1 is provided with a braided shielding wire 53-1, and the shielding wire 53-1 includes a braided phase wire shielding wire 53-1 wrapped on an outer surface of an insulating protective layer of the phase wire 1-1-1 and a braided neutral wire shielding wire 1-2-2 wrapped on an outer surface of an insulating protective layer of the neutral wire 1-2-1.

In this embodiment, an insulating protective layer is provided on at least any one of the outer surfaces of the phase wire shielding wire 1-1-2 and the neutral wire shielding wire 1-2-2.

In this embodiment, an insulating protective layer 1-1-3 wrapping the phase wire shielding wire is provided on the outer surface of the phase wire shielding wire 1-1-2, and the leakage current detecting circuit 53 includes the neutral wire shielding wire 1-2-2 and the phase wire shielding wire 1-1-2 connected in series. The end 53-2 of the leakage current detecting circuit 53 is one end of the neutral wire shielding wire 1-2-2, the other end of the neutral wire shielding wire 1-2-2 is connected in series with the other end of the phase wire shielding wire 1-1-2, and one end of the phase wire shielding wire 1-1-2 is the other end 53-3 of the leakage current detecting circuit 53.

In an embodiment, the insulating protective layer wrapping the neutral wire shielding wire 1-2-2 can be provided on the outer surface of the neutral wire shielding wire 1-2-2.

In an embodiment, the insulating protective layer wrapping the wire shielding wire can be both provided on the outer surface of the phase wire shielding wire 1-1-2 and the outer surface of the neutral wire shielding wire 1-2-2.

FIG. 3 is a schematic cross-sectional view that the insulating protective layer 1-1-3 wrapping the phase wire shielding wire is provided on the outer surface of the phase wire shielding wire 1-1-2. Reference sign 1-5 represents the insulation protective layer of the power line 1; reference sign 1-1-3 represents the insulation protective layer of the phase wire shielding wire 1-1-2; and reference sign 1-1-1 represents the insulation protective layer of the phase wire 1-1. In this embodiment, in order to reduce the product cost, no insulating protective layer is provided on the neutral wire shielding wire 1-2-2. Reference sign 1-2-1 represents the insulation protective layer of the neutral wire 1-2, and reference sign 1-3-1 represents the insulation protective layer of the earth wire 1-3.

The shielding wire 53-1 of the power line 1 is monitored as follows: when the circuit breaker is reset and powered on, the fourth resistance 51-2 in the power line monitoring circuit 5 supplies a power to the leakage current detecting circuit 53 and carries out a status inspection of the leakage current detecting circuit 53. If a connection between the phase wire shielding wire 1-1-2 and the neutral wire shielding wire 1-2-2 is complete, the leakage current detecting circuit 53 is in an access state, two ends of the leakage current detecting circuit 53 is 0 volt, a voltage value between the first node 51-3 and the second node 51-4 is 0, and a voltage value between the second foot end 52-3 and the third foot end 52-4 of the state judging circuit 52 is also 0, so that the second silicon controlled rectifier 52-1 of the state judging circuit 52 and the first silicon controlled rectifier 4-1 of the first trigger driving circuit 4 are cut off and disconnected, and the circuit breaker keeps a reset power supply. If there is an open circuit in the phase wire shielding wire 1-1-2 or the neutral wire shielding wire 1-2-2, the leakage current detecting circuit 53 is in an open circuit state, and the two ends of the leakage current detecting circuit 53 will generate a signal, the fourth resistance 51-2 connected in parallel between the first node 51-3 and the second node 51-4 can adjust a size of the signal, and make the second silicon controlled rectifier 52-1 of the state judging circuit 52 and the first silicon controlled rectifier 4-1 of the first trigger driving circuit 4 be turned on to cause the circuit breaker to trip and cut off the power, which terminate the use when the shielding wire 53-1 fails and the leakage current detecting circuit 53 is disconnected, so as to avoid the electrical fire incident.

The principle and technology of detecting the leakage current between the phase wire and the neutral wire in the power wire are already known, which will not be repeated here.

Second Embodiment

Figure 5:
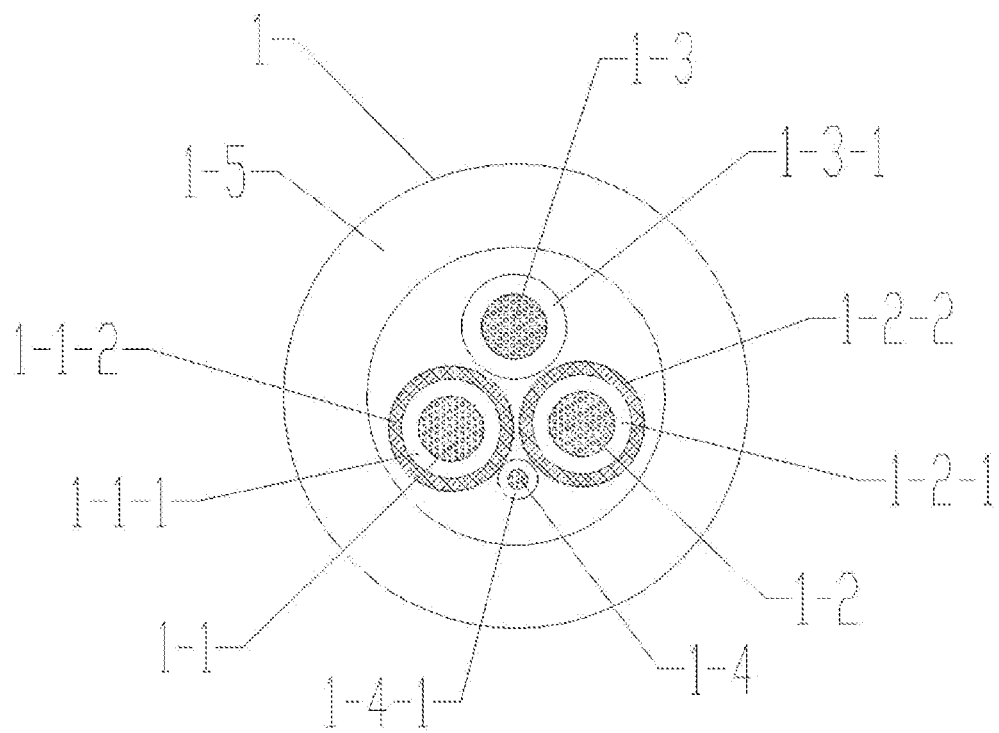
FIG. 5 is a schematic cross-sectional view of the power line in FIG. 4.

Referring to FIG. 1, FIG. 4, and FIG. 5, compared with the first embodiment, a structure of the power line 1 and a connecting method of the neutral wire shielding wire 1-2-2 and the phase wire shielding wire 1-1-2 in the leakage current detecting circuit 53 is changed. In this embodiment, the neutral wire shielding wire 1-2-2 and the phase wire shielding wire 1-1-2 are connected in parallel. Therefore, the outer surface of the neutral wire shielding wire 1-1-2 and the outer surface of the phase wire shielding wire 1-1-2 need not be wrapped with the insulating protective layer.

In this embodiment, the power line 1 is provided with the braided shielding wire 53-1, and the shielding wire 53-1 includes the braided phase wire shielding wire 1-1-2 wrapping the outer surface of the insulating protective layer of the phase wire 1-1-1 and the braided neutral wire shielding wire 1-2-2 wrapping the outer surface of the insulating protective layer of the neutral wire 1-2-1.

In this embodiment, the power line 1 is also provided with a signal wire 1-4 with an insulating protective layer. The neutral wire shielding wire 1-2-2 is connected in parallel with the phase wire shielding wire 1-1-2 and is connected in series with the signal wire 1-4 to form the leakage current detecting circuit 53. One end of the neutral wire shielding wire neutral wire 1-2-2 is connected in parallel with one end of the phase wire shielding wire phase wire 1-1-2 to be the end 53-2 of the leakage current detecting circuit 53. The other end of the neutral wire shielding wire neutral wire 1-2-2, the other end of the phase wire shielding wire phase wire 1-1-2 and the other end of the signal wire 1-4 are connected in parallel, and one end of the signal wire 1-4 is the other end 53-3 of the leakage current detecting circuit 53.

In this embodiment, the neutral wire shielding wire neutral wire 1-2-2 and the phase wire shielding wire phase wire 1-1-2 are connected in parallel, when the neutral wire shielding wire neutral wire 1-2-2 or the phase wire shielding wire phase wire 1-1-2 is disconnected, although the circuit breaker cannot trip and cut off the power, it can still continue to detect leakage current protection. Once the detected leakage current is abnormal, the circuit breaker will automatically trip. When the neutral wire shielding wire neutral wire 1-2-2 and the phase wire shielding wire phase wire 1-1-2 are all open circuit or the signal wire 1-4 is open circuit, the circuit breaker will automatically trip.

In the present embodiment, the state judging circuit 52 includes a negative-positive-negative (NPN) triode. The triode is a negative-positive-negative (NPN) triode 52-5, and the first foot end 52-2 of the state judging circuit 52 is the collector end of the negative-positive-negative (NPN) triode 52-5, the second foot end 52-3 of the state judging circuit 52 is the base end of the negative-positive-negative (NPN)

triode 52-5, and the third foot end 52-4 of the state judging circuit 52 is the emitter end of the negative-positive-negative (NPN) triode 52-5.

Referring to FIG. 2, the state judging circuit 52 is the second silicon controlled rectifier 52-1. The first foot end 52-2 of the state judging circuit 52 is the positive end of the second silicon controlled rectifier 52-1, the second foot end 52-3 is the control end of the second silicon controlled rectifier 52-1, and the third foot end 52-4 is the negative end of the second silicon controlled rectifier 52-1.

In this embodiment, one end of the test circuit 6 is connected in parallel with the other end of the neutral wire 1-2, and the other end of the test circuit 6 is connected in parallel with the other end of the third resistance 51-1.

In an embodiment, one end of the test circuit 6 is connected in parallel with one end of the third resistance 51-1, and the other end of the test circuit 6 is connected in parallel with the other end of the third resistance 51-1, referring to FIG. 2.

In an embodiment, one end of the test circuit 6 is connected in parallel with the other end of the phase wire 1-1, and the other end of the test circuit 6 is connected in parallel with the third resistance 51-1, referring to FIG. 6.

FIG. 5 is a schematic cross-sectional view of the power line in this embodiment. Reference sign 1-5 represents the insulating protective layer of power line 1; reference sign 1-1-2 represents the phase wire shielding wire, reference sign 1-1-1 represents the insulating protective layer of the phase wire 1-1, and reference sign 1-2-2 represents the neutral wire shielding wire, reference sign 1-2-1 represents the insulation protective layer of the neutral wire 1-2, reference sign 1-3-1 represents the insulation protective layer of the earth wire 1-3, and reference sign 1-4-1 represents the insulation protective layer for the signal wire 1-4.

The circuit structure principle of the leakage current detecting circuit 53 monitoring the power line 1 and the state judging circuit 52 are identical with the first embodiment, and the working process of the leakage current detection between the phase line and the neutral line of the power line 1 are all identical with the first embodiment, which will not be repeated here.

Third Embodiment

Figure 7:
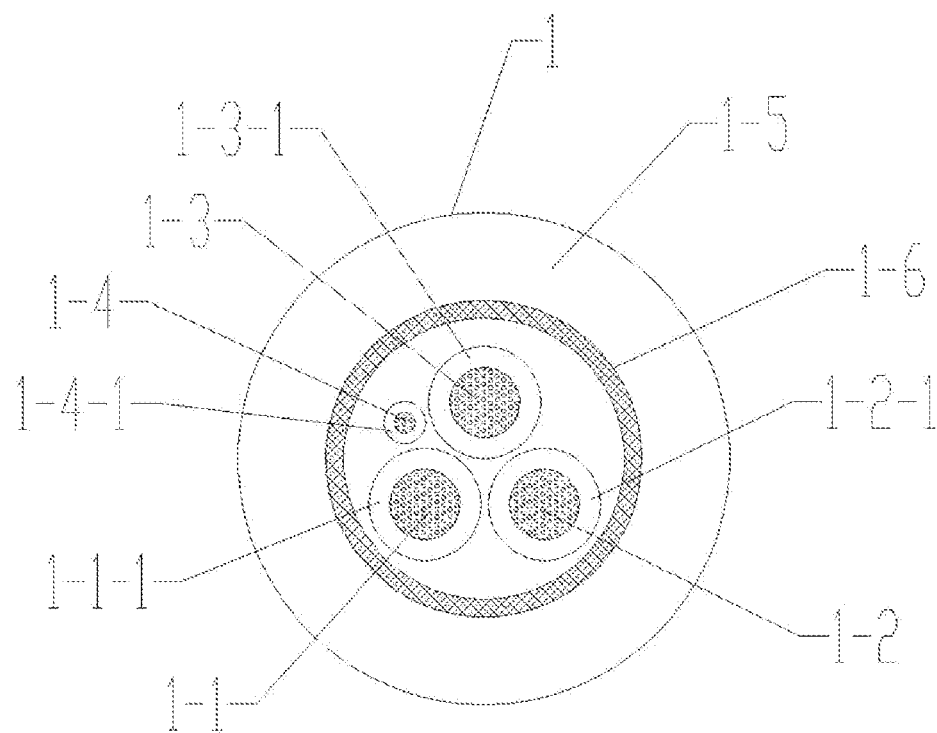
FIG. 7 is a schematic cross-sectional view of the power line FIG. 6.

Referring to FIG. 1, FIG. 6, and FIG. 7, compared with the first embodiment, a structure of the power line 1, and a connecting method of the shielding wire 53-1 in the leakage current detecting circuit 53 and the signal wire 1-4 with the insulating protective layer is changed.

The signal wire 1-4 with the insulating protective layer is provided on the power line 1, the shielding wire 53-1 in the power line 1 includes a common shielding layer wire 1-6 wrapping the outer surface of the insulating protective layer of the phase wire 1-1-1 in the power line 1 and wrapping the outer surface of the neutral wire 1-2-1. One end of the common shielding layer wire 1-6 is one end of the shielding wire 53-1, and the other end of the common shielding layer wire 1-6 is the other end of the 53-1. One end of the shielding wire 53-1 is the end 53-2 of the leakage current detecting circuit 53, the other end of the shielding wire 53-1 is connected in series with the other end of the signal wire 1-4, and one end of the signal wire 1-4 is the other end of the leakage current detecting circuit 53.

In this embodiment, not only the common shielding layer wire 1-6 is wrapped on the outer surface of the insulating protective layer of the phase wire 1-1-1 and the neutral wire 1-2-1, but it is also wrapped on an outer surface of a signal wire insulating layer 1-4-1 and an outer surface of a earth wire insulating layer 1-3-1.

In an embodiment, the common shielding layer wire 1-6 is only wrapped on the outer surface of the insulating protective layer of the phase wire 1-1-1 and the outer surface of the neutral wire 1-2-1. The signal wire 1-4 and the signal wire insulating layer 1-4-1, the earth wire 1-3 and the earth wire insulating layer 1-3-1 are provided outside the outer surface of the common shielding layer wire 1-6, but are in a power line insulating layer 1-5.

In this embodiment, the state judging circuit 52 is a triode, and the triode is a negative-positive-negative (NPN) triode 52-5. The first foot end 52-2 of the state judging circuit 52 is the collector end of the negative-positive-negative (NPN) triode 52-5, the second foot end 52-3 is the base end of the negative-positive-negative (NPN) triode 52-5, and the third foot end 52-4 is the emitter end of the negative-positive-negative (NPN) triode 52-5.

In an embodiment, referring to FIG. 2, the state judging circuit 52 is the second silicon controlled rectifier 52-1, the first foot end 52-2 of the state judging circuit 52 is the positive end of the second silicon controlled rectifier 52-1, the second foot end 52-3 is the control end of the second silicon controlled rectifier 52-1, and the third foot end 52-4 is the negative end of the second silicon controlled rectifier 52-1.

In this embodiment, one end of the test circuit 6 is connected in parallel with the other end of the phase wire 1-1, and the other end of the test circuit 6 is connected in parallel with the other end of the third resistance 51-1.

In an embodiment, the end of the test circuit 6 is connected in parallel with the end of the third resistance 51-1, and the other end of the test circuit 6 is connected in parallel with the other end of the third resistance 51-1, referring to FIG. 2.

In an embodiment, the end of the test circuit 6 is connected in parallel with the other end of the neutral wire 1-2, and the other end of the test circuit 6 is connected in parallel with the other end of the third resistance 51-1, referring to FIG. 4.

FIG. 7 is a schematic cross-sectional view of the power line in this embodiment. Reference sign 1-5 represents the insulating protective layer of power line 1; reference sign 1-6 represents the common shielding layer wire, reference sign 1-1-1 represents the insulating protective layer of the phase line 1-1, reference sign 1-2-1 represents the insulating protective layer of the neutral wire 1-2, reference sign 1-3-1 represents the insulation protective layer of the earth wire 1-3, and reference sign 1-4-1 represents the insulation protective layer of the signal wire 1-4.

The circuit structure principle of the leakage current detecting circuit 53 monitoring the power line 1, the state judging circuit 52 are all identical with the first embodiment, and the working process of the leakage current detection between the phase line 1-1 and the neutral line 1-2 of the power line 1 are all identical with the first embodiment, which will not be repeated here.

What is claimed is:

1. A circuit breaker, comprising a housing, a plug pin, a power line, a rectifier circuit, an electromagnetic tripping and locking device, the electromagnetic tripping and locking device comprising an electromagnetic coil, a switch contact, a test circuit, and a first trigger driving circuit, the power line comprising a phase wire and an insulating protective layer of the phase wire, a neutral wire and an insulating protective layer of the neutral wire, and a braided shielding wire, and the first trigger driving circuit comprising a first silicon controlled rectifier, a first resistance, and a second resistance, wherein:
  a power line monitoring circuit is provided, and the power line monitoring circuit comprises a third resistance, a fourth resistance, a leakage current detecting circuit and a state judging circuit;
  the state judging circuit is provided with a first foot end, a second foot end, and a third foot end;
  one end of the third resistance, a power supply end of the rectifier circuit, the first foot end of the state judging circuit and a positive end of the first silicon controlled rectifier are connected in parallel, and the other end of the third resistance, one end of the fourth resistance, the second foot end of the state judging circuit, and one end of the leakage current detecting circuit are connected in parallel to form a first node;
  the other end of the fourth resistance, one end of the first resistance, the third foot end of the state judging circuit and the other end of the leakage current detecting circuit are connected in parallel to form a second node;
  the other end of the first resistance, a control end of the first silicon controlled rectifier, and one end of the second resistance are connected in parallel; and
  a negative end of the first silicon controlled rectifier, the other end of the second resistance, and a common end of the rectifier circuit are connected in parallel.

2. The circuit breaker of claim 1, wherein the state judging circuit comprises a second silicon controlled rectifier; the first foot end of the state judging circuit is a positive end of the second silicon controlled rectifier; the second foot end of the state judging circuit is a control end of the second silicon controlled rectifier; and the third foot end of the state judging circuit is a negative end of the second silicon controlled rectifier.

3. The circuit breaker of claim 1, wherein the state judging circuit comprises a triode.

4. The circuit breaker of claim 3, wherein the triode is a negative-positive-negative (NPN) triode, the first foot end of the state judging circuit is a collector end of the NPN triode, the second foot end is a base end of the NPN transistor, and the third foot end is an emitter end of the NPN transistor.

5. The circuit breaker of claim 1, wherein the power line is provided with the braided shielding wire, and the shielding wire comprises a phase wire shielding wire wrapping an outer surface of the insulating protective layer of the phase wire and a neutral wire shielding wire wrapping an outer surface of the insulating protective layer of the neutral wire.

6. The circuit breaker of claim 1, wherein:
at least one of the outer surface of the phase wire shielding wire and the outer surface of the neutral wire shielding wire is provided with an insulating protective layer; and
the leakage current detecting circuit comprises the neutral wire shielding wire and the phase wire shielding wire connected in series; one end of the leakage current detecting circuit is one end of the neutral wire shielding wire, and the other end of the neutral wire shielding wire is connected in series with the other end of the phase wire shielding wire; one end of the phase wire shielding wire is the other end of the leakage current detecting circuit.

7. The circuit breaker of claim 1, wherein:
a signal wire with an insulating protective layer is also provided in the power line;
the neutral wire shielding wire is connected in parallel with the phase wire shielding wire and is connected in series with the signal wire to form the leakage current detecting circuit; and
one end of the neutral wire shielding wire and one end of the phase wire shielding wire are connected in parallel to be one end of the leakage current detecting circuit, the other end of the neutral wire shielding wire, the other end of the phase wire shielding wire and the other end of the signal wire are connected in parallel, and one end of the signal wire is the other end of the leakage current detecting circuit.

8. The circuit breaker of claim 1, wherein:
the power line is provided with the braided shielding wire, and the braided shielding wire comprises a common shielding wire wrapping the outer surface of the insulating protective layer of the phase wire and the outer surface of the insulating protective layer of the neutral wire;
the signal wire with the insulating protective layer is also provided in the power line;
one end of the common shielding wire is one end of the shielding wire in the power line, the other end of the common shielding wire is the other end of the shielding wire in the power line; and
one end of the braided shielding wire in the power line is one end of the leakage current detecting circuit, the other end of the braided shielding wire in the power line is connected in series with the other end of the signal wire, and one end of the signal wire is the other end of the leakage current detecting circuit.

* * * * *